No. 627,107. Patented June 20, 1899.
M. FISCHHABER.
AUTOMATIC WEIGHING AND PRICING MACHINE.
(Application filed Jan. 14, 1899.)
(No Model.) 2 Sheets—Sheet 1.
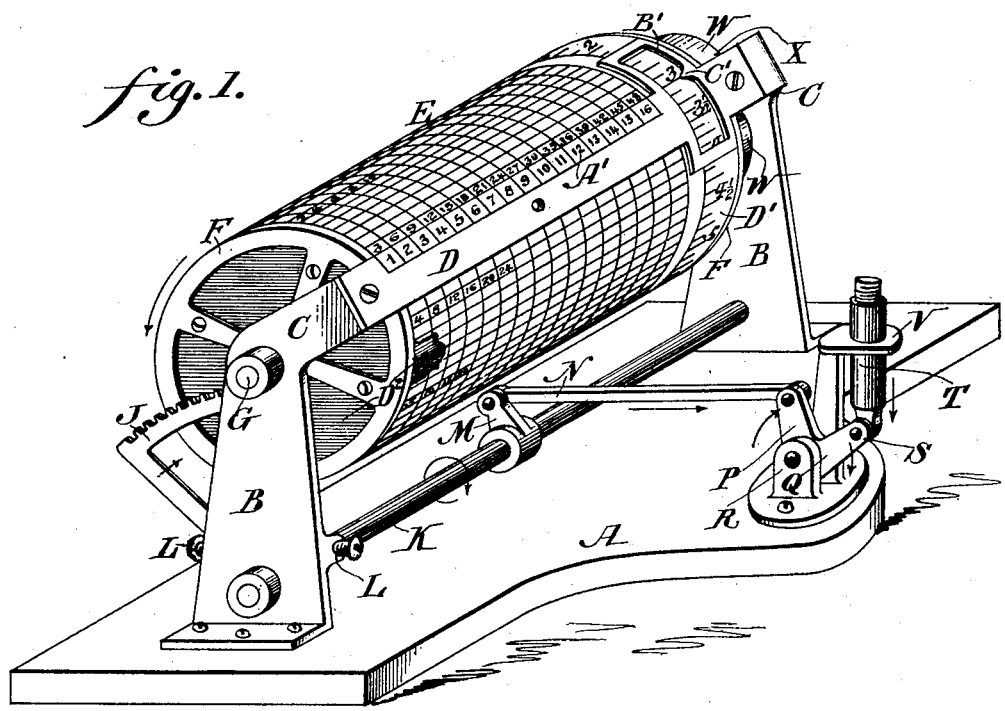
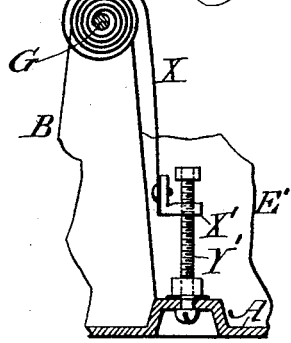
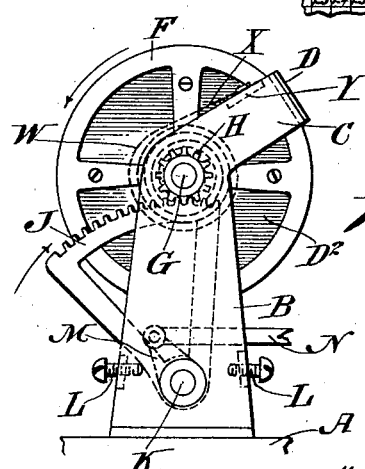
Witnesses
L. Douville
P. F. ...
Inventor
Manfred Fischhaber.
BY
Niederohein & Fairbanks
Attorneys No. 627,107. Patented June 20, 1899.
M. FISCHHABER.
AUTOMATIC WEIGHING AND PRICING MACHINE.
(Application filed Jan. 14, 1899.)
(No Model.) 2 Sheets—Sheet 2.
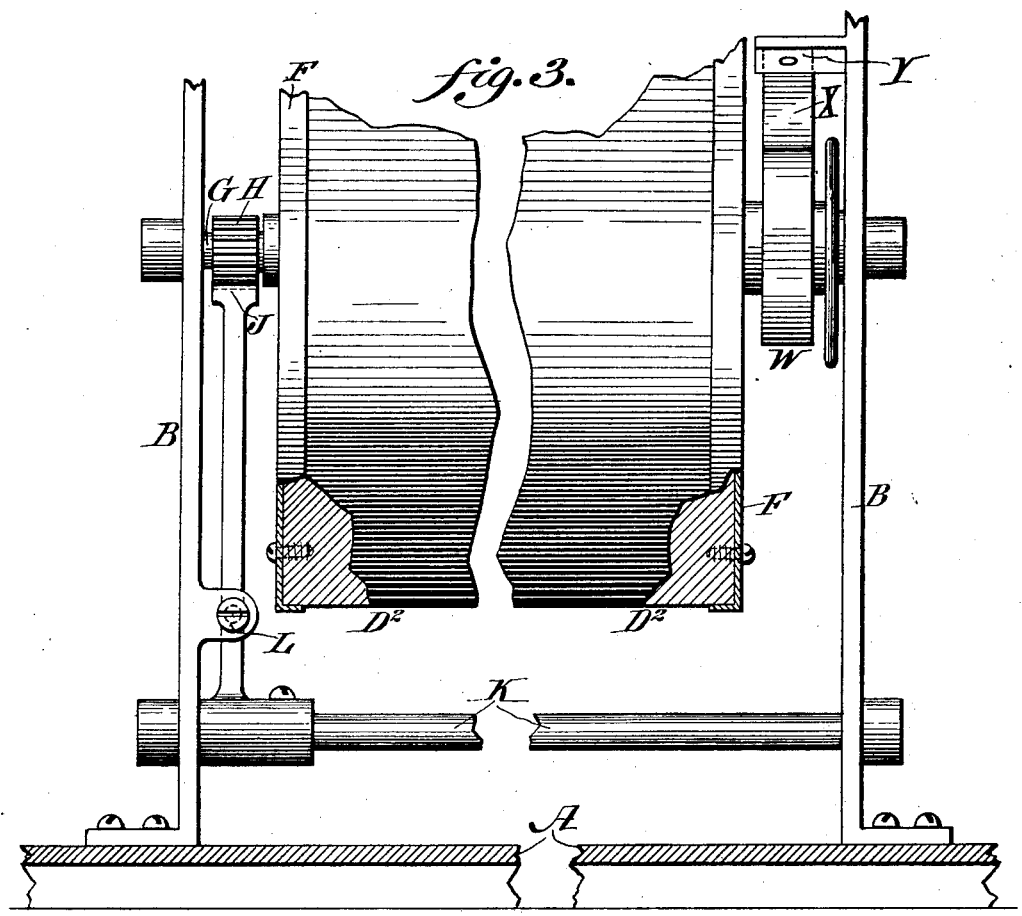
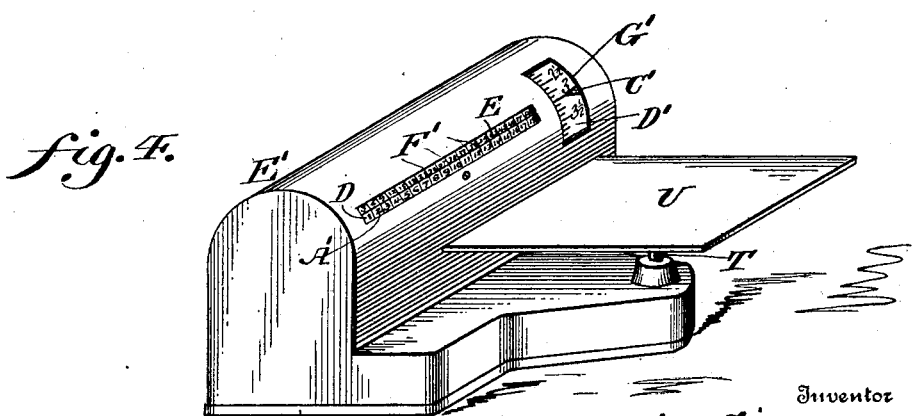

UNITED STATES PATENT OFFICE.

MANFRED FISCHHABER, OF NEW YORK, N. Y.

AUTOMATIC WEIGHING AND PRICING MACHINE.

SPECIFICATION forming part of Letters Patent No. 627,107, dated June 20, 1899.

Application filed January 14, 1899. Serial No. 702,121. (No model.)

*To all whom it may concern:*

Be it known that I, MANFRED FISCHHABER, a citizen of the United States, residing in the city, county, and State of New York, have invented a new and useful Improvement in Automatic Weighing and Pricing Machines, which improvement is fully set forth in the following specification and accompanying drawings.

My invention relates to improvements in combined weighing and pricing machines; and it consists of means whereby the article weighed will indicate its weight and also the price corresponding therewith.

Figure 1 represents a perspective view of an automatic weighing or pricing machine embodying my invention. Fig. 2 represents an end elevation of a portion of the same. Fig. 3 represents, on an enlarged scale, a partial side elevation and partial vertical section of certain portions of the apparatus. Fig. 4 represents, on a reduced scale, a perspective view of the apparatus, showing the casing therefor. Fig. 5 represents a plan view of a portion of a chart or price-list employed, the same being on an enlarged scale. Fig. 6 represents a view of a modification.

Similar letters of reference indicate corresponding parts in the figures.

Referring to the drawings, A designates the bed or base of the machine, the same having supported thereupon the uprights or standards B, which have their upper portions C shaped so as to form a support for the scale D, which extends transversely of said standards and is secured in position in any suitable manner.

$D^2$ designates a roll or cylinder which may be composed of any suitable material and has fastened to the outer periphery thereof the chart or price-list E, having numbers thereon, the ends of said roll having attached thereto the plates or spiders F in any suitable manner, which have the trunnions G extending therefrom and mounted in suitable bearings in said standards. One of the trunnions G has attached thereto the pinion H, which latter meshes with the rack or segment J, which is mounted upon the shaft K, so as to oscillate in unison therewith, the extent of rotation of said segment and its shaft being limited in either direction by means of the stops L, which can be readily adjusted according to requirements.

M designates a rock-arm mounted on the shaft K and having pivotally attached thereto one end of the link N, the other extremity of the latter being secured to the member P of the bell-crank Q, which latter is pivotally mounted in the ears R and has its other member S pivotally connected to the stem T, the upper portion of which is provided with the plate or pan U, upon which the article to be weighed is placed, said stem being suitably guided in the plate V.

W designates a spring having one extremity attached to one of the trunnions of the cylinder $D^2$, while its other end X is secured to a suitable fixed point, as Y, wherefrom it will be seen that the cylinder $D^2$ will after use always return to its normal position by reason of the tension of said spring.

The scale D is provided near one edge with the series of numerals A' and has near one extremity the open space B', in which is located the indicator or index-point C'. The space B' must be large enough so as to enable the user to ascertain therethrough the number of pounds which are indicated on the portion D' of the chart at the extreme right of the roll, as will be apparent from Figs. 1 and 5.

The chart E is divided up into a series of numbers, which increase in the present instance from left to right and are properly regulated or calculated with respect to the number of pounds indicated at the extreme right-hand portion thereof, wherefrom it will be evident that a certain number of pounds being indicated by means of the point, as C', the exact price thereof can be instantly ascertained from the chart and scale, as will be explained.

In practice I cover the working parts of the apparatus with a suitable casing E' of any suitable material and provide the openings F' and G' therein, which are preferably covered with glass, and it will also be evident that, if desired, I may secure the scale D directly to the outer portion of the casing E', adjacent to the glass covering or opening F', should I so desire, without departing from the spirit of my invention.

The operation is as follows: When the parts are in normal position, the pointer C' is adjacent to the zero-mark, as indicated in Fig. 5, and if the article to be weighed is placed on the pan or plate U it will be seen that by its weight the several parts will be caused to move in the direction of the arrows in Fig. 1, and by the engagement of the rack J with the pinion H the cylinder D will rotate in the direction of its arrow until the proper weight is indicated, the spring Q having of course been previously adjusted or tested to the proper extent. If we assume that the weight of the article is three pounds, the cylinder will rotate until the number "3" stops at the indicator C', and if we assume that a pound of the material weighed costs sixteen cents then the operator has only to glance at the number "16" of the scale D and note the number above or adjacent to it on the chart carried by the cylinder, the same being of course forty-eight cents, as indicated in Fig. 1. This of course will be the price of three pounds of the material weighed, and all other prices on the price-list will be in the same proportion to the weight, it being apparent that the indicator C' is in alinement with the upper outside line or edge of the scale B. It will of course be evident that for fractions of pounds, &c., corresponding changes can be made on the pound-marks and upon the chart, as will be understood from Fig. 5. When the article has been weighed and the price noted, upon the removal of the same the tension of the spring will cause the parts to again assume the position indicated in Fig. 5.

When the machine is in operative condition, as indicated in Fig. 4, it will be apparent that the same presents a pleasing aspect to the eye, since all the moving parts are incased and the only openings visible are the glass-covered openings F' and G'.

It will be evident that slight changes may be made by those skilled in the art which will come within the scope of my invention, and I do not, therefore, desire to be restricted to the exact construction I have herein shown and described.

In the modification seen in Fig. 6 the spring W has one extremity attached to one of the trunnions G of the cylinder D², while its other end X is secured to a movable plate X', provided with a threaded opening to receive the threaded portion of a screw Y', which latter when rotated causes the plate X' to either raise or lower and thereby increase or diminish the power of the spring W, as is evident, it being understood that the screw Y' is swiveled in the base A of the machine and may be easily operated from the outside of the casing E'.

Having thus described my invention, what I claim as new, and desire to secure by Letters Patent, is—

1. In an automatic weighing and pricing machine, a bell-crank pivotally supported, a scale pan or plate suitably supported upon said bell-crank, a rock-shaft suitably mounted, a rock-arm carried by said rock-shaft and connected with said bell-crank, a segment mounted on said rock-shaft, a cylinder having trunnions mounted in suitable bearings, a pinion attached to one of said trunnions and meshing with said rack, a spring attached to the other of said trunnions, a chart having thereon characters indicative of pounds attached to said roll, and a stationary scale extending longitudinally of the latter, and having numerals thereon, said chart also having numerals thereon in line with the numerals on said scale.

2. In an automatic weighing and pricing machine, the combination of a cylinder having a chart provided with indicating characters, trunnions on which said cylinder is mounted, a pinion moving in unison with said cylinder, a rack in mesh with said pinion, a rock-shaft to which said rack is attached, a spring suitably attached to one of said trunnions, means for adjusting the tension of said spring and means for oscillating said rock-shaft by the weight of the article weighed.

MANFRED FISCHHABER.

Witnesses:
Tr. Brandt,
S. Amsterdam.